(12) United States Patent
Singh

(10) Patent No.: US 9,251,213 B2
(45) Date of Patent: Feb. 2, 2016

(54) ESTIMATING ERROR PROPAGATION FOR DATABASE OPTIMIZERS

(71) Applicant: International Business Machines Corporation, Armonk, NY (US)

(72) Inventor: Harpreet Singh, Lenexa, KS (US)

(73) Assignee: International Business Machines Corporation, Armonk, NY (US)

(*) Notice: Subject to any disclaimer, the term of this patent is extended or adjusted under 35 U.S.C. 154(b) by 310 days.

(21) Appl. No.: 13/843,657

(22) Filed: Mar. 15, 2013

(65) Prior Publication Data

US 2014/0280280 A1    Sep. 18, 2014

(51) Int. Cl.
*G06F 17/30* (2006.01)

(52) U.S. Cl.
CPC ................. *G06F 17/30469* (2013.01)

(58) Field of Classification Search
CPC ............ G06F 17/30469; G06F 17/30463
USPC ................................................. 707/759
See application file for complete search history.

(56) References Cited

U.S. PATENT DOCUMENTS

| 7,240,044 | B2 * | 7/2007 | Chaudhuri et al. |
| 7,249,120 | B2 * | 7/2007 | Bruno .............. G06F 17/30469 |
| 8,140,568 | B2 * | 3/2012 | Abdo ............... G06F 17/30469 707/706 |
| 2003/0115183 | A1 * | 6/2003 | Abdo ............... G06F 17/30536 |
| 2005/0004907 | A1 * | 1/2005 | Bruno et al. ..................... 707/4 |
| 2005/0004979 | A1 * | 1/2005 | Berkowitz ............ G06F 3/0601 709/203 |
| 2008/0052269 | A1 * | 2/2008 | Abdo ............... G06F 17/30536 |
| 2008/0195578 | A1 * | 8/2008 | Hueske et al. ................... 707/2 |
| 2009/0271360 | A1 * | 10/2009 | Bestgen et al. ................. 707/2 |
| 2014/0101133 | A1 * | 4/2014 | Carston et al. ................ 707/718 |

* cited by examiner

*Primary Examiner* — Sheree Brown
(74) *Attorney, Agent, or Firm* — Patterson & Sheridan, LLP

(57) ABSTRACT

Techniques are disclosed to determine error propagation for a query optimizer component of a database management system for a database. A database query is received that specifies one or more query conditions. Measures of actual and estimated selectivity of the one or more query conditions are determined. A measure of estimated deviation between the measures of actual and estimated selectivity is determined. A query execution plan is generated or selected based on the measure of estimated deviation.

20 Claims, 4 Drawing Sheets

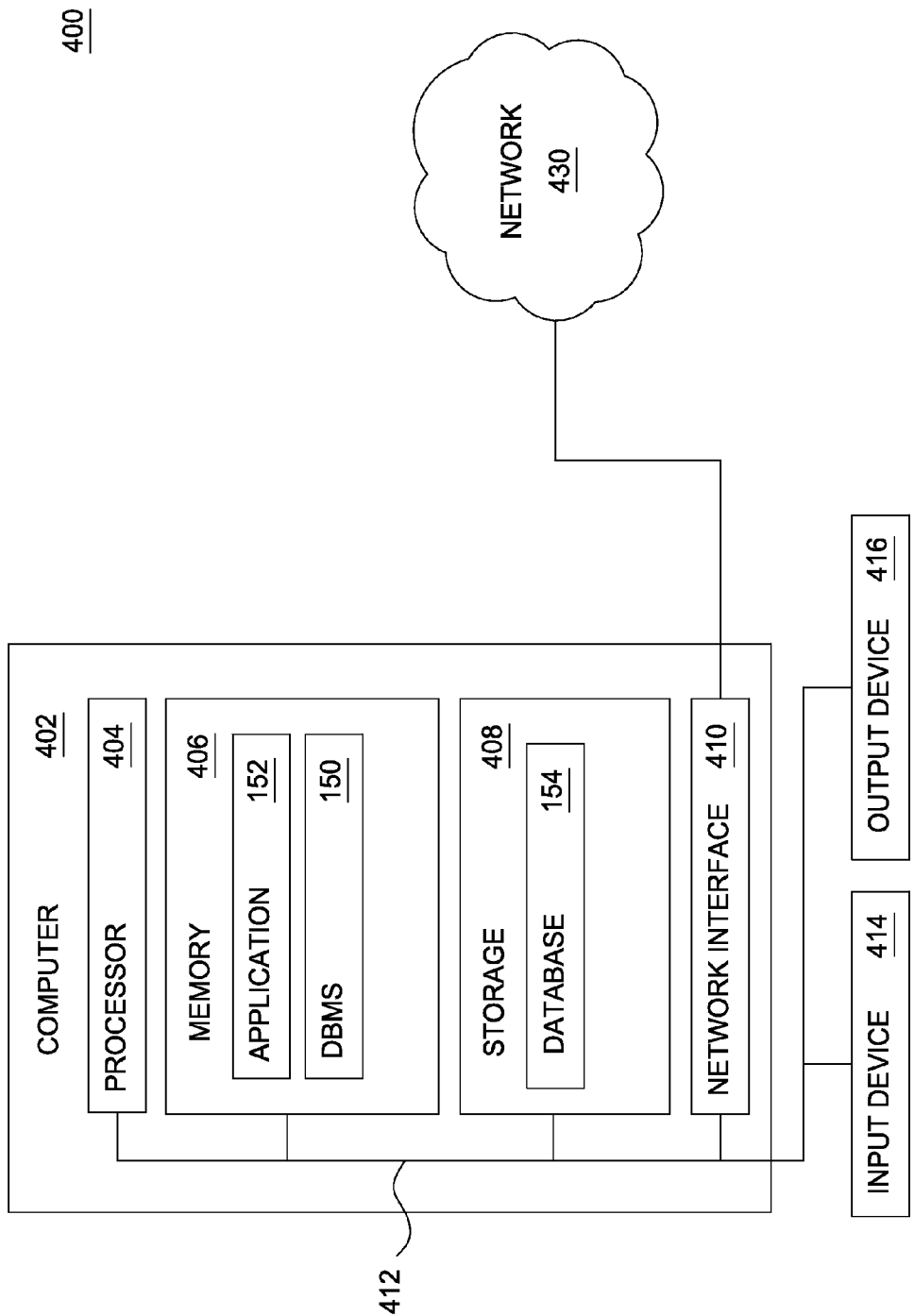

ESTIMATING ERROR PROPAGATION FOR DATABASE OPTIMIZERS

BACKGROUND

1. Field of the Invention

Embodiments disclosed herein relate to computer databases. More specifically, embodiments disclosed herein relate to estimating error propagation for database optimizers.

2. Description of the Related Art

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments presented in this disclosure provide a computer-implemented method to determine error propagation for a query optimizer component of a database management system (DBMS) for a database. The method includes receiving a database query specifying one or more query conditions. The method also includes determining a measure of actual selectivity of the one or more query conditions specified in the received database query. The method also includes determining a measure of estimated selectivity of the one or more query conditions specified in the received database query. The method also includes determining a measure of estimated deviation between the determined measure of actual selectivity and the determined measure of estimated selectivity. The query optimizer component is configured to perform at least one of generating a first query execution plan based on the received database query and based further on the determined measure of estimated deviation, and selecting, based on the determined measure of estimated deviation, the first query execution plan from a plurality of distinct query execution plans generated based on the received database query.

Other embodiments presented in this disclosure provide a computer program product to determine error propagation for a query optimizer component of a DBMS for a database. The computer program product includes a computer-readable storage medium having program code embodied therewith. The program code is executable by one or more computer processors to receive a database query specifying one or more query conditions. The program code is also executable to determine a measure of actual selectivity of the one or more query conditions specified in the received database query. The program code is also executable to determine a measure of estimated selectivity of the one or more query conditions specified in the received database query. The program code is also executable to determine a measure of estimated deviation between the determined measure of actual selectivity and the determined measure of estimated selectivity. The query optimizer component is configured to perform at least one of generating a first query execution plan based on the received database query and based further on the determined measure of estimated deviation, and selecting, based on the determined measure of estimated deviation, the first query execution plan from a plurality of distinct query execution plans generated based on the received database query.

Still other embodiments presented in this disclosure provide a system to determine error propagation for a query optimizer component of a DBMS for a database. The system includes one or more computer processors and a memory containing a program which, when executed by the one or more computer processors, is configured to perform an operation that includes receiving a database query specifying one or more query conditions. The operation also includes determining a measure of actual selectivity of the one or more query conditions specified in the received database query. The operation also includes determining a measure of estimated selectivity of the one or more query conditions specified in the received database query. The operation also includes determining a measure of estimated deviation between the determined measure of actual selectivity and the determined measure of estimated selectivity. The query optimizer component is configured to perform at least one of generating a first query execution plan based on the received database query and based further on the determined measure of estimated deviation, and selecting, based on the determined measure of estimated deviation, the first query execution plan from a plurality of distinct query execution plans generated based on the received database query.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 is a block diagram illustrating components of a networked system for estimating error propagation in selectivity values, according to one embodiment presented in this disclosure.

DETAILED DESCRIPTION

Database management systems (DBMSs) may often include an optimizer component configured to determine an appropriate execution plan for a database query. The optimizer component is also referred to herein as a query optimizer or database optimizer. One example of an optimizer component is a cost-based optimizer. A cost-based optimizer may be configured to generate and evaluate alternative execution plans for a database query, to select an appropriate execution plan for execution. The execution plans may be generated or evaluated based on predefined evaluation rules and criteria. At least in some embodiments, the evaluation criteria may include a measure of selectivity, which characterizes an extent to which one or more specified conditions associated with the database query is selective in filtering data stored in a database managed by the DBMS.

In some embodiments, to calculate selectivity, a cost-based optimizer may rely on underlying statistical input data provided by the DBMS. In such cases, a degree of error may be introduced into the selectivity calculation, and the degree of error may often be indeterminate. Examples of statistical input data include any sampled data such as dispersion, frequent values, histograms, etc. Estimating the error in selectivity calculations due to statistical input may pose many challenges. For example, using an arbitrary number to validate the selectivity output is a subjective approach that may lead to overestimation or underestimation in determining the error propagation in selectivity output.

At least some embodiments presented herein provide techniques to estimate error propagation in selectivity values for cost-based optimizers configured to use potentially imprecise statistical input data for selectivity calculation. The provided techniques do not require any user-specified number to estimate the error propagation in selectivity values, thereby eliminating the need for an arbitrary, static number to define a baseline for validation. By using the techniques disclosed herein, a baseline value and an upper limit value may be estimated using inaccuracies in statistical input and an upper limit of the error in individual statistics, respectively. Further, the error propagation in selectivity calculations may be estimated in order to provide a more accurate estimate of the deviation between actual and calculated selectivity values at least in some cases. The estimates may then be used in generating or selecting execution plans responsive to received database queries. Doing so may improve query processing efficiency of the database system at least in some cases. Execution plans are also referred to herein as query execution plans or access plans.

Figure 1:
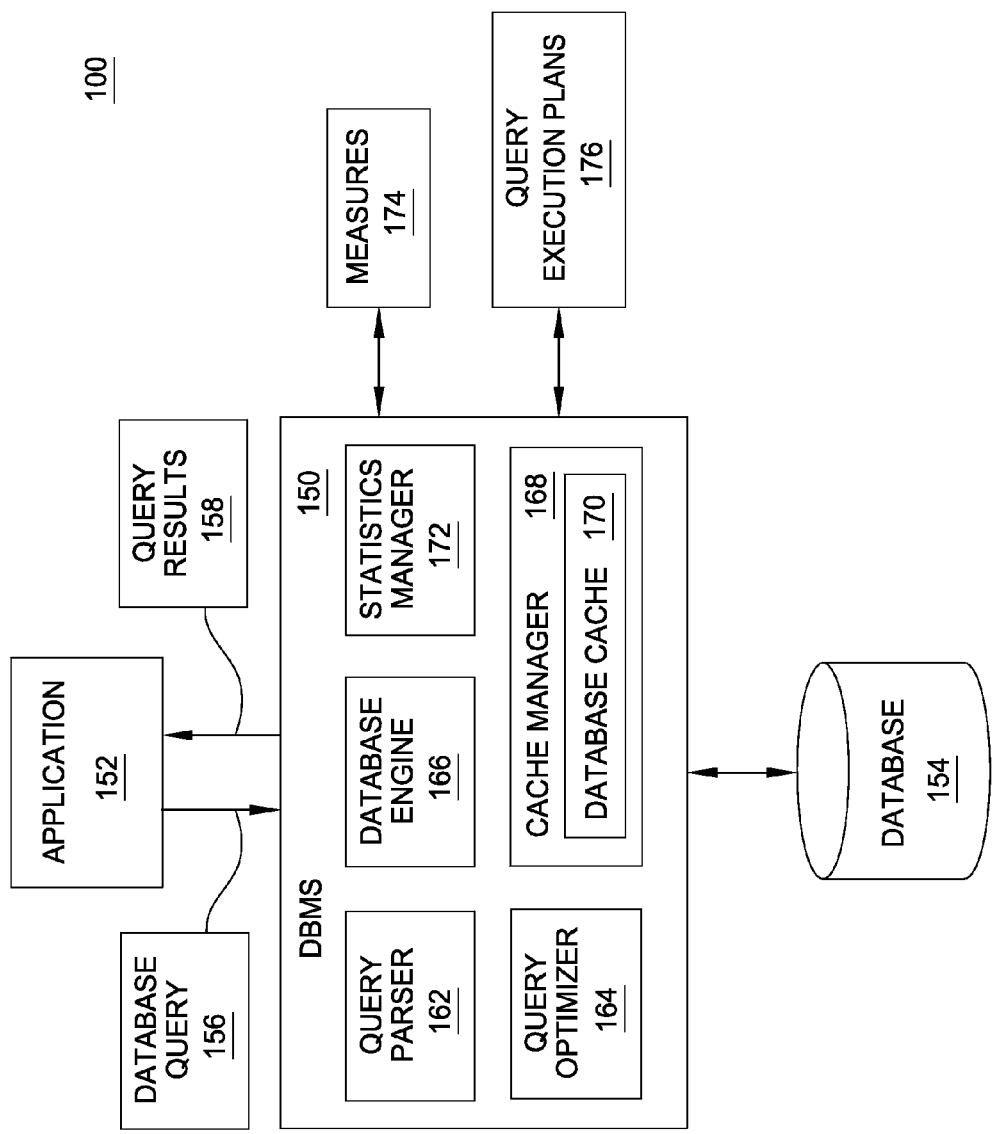
FIG. 1 is a block diagram illustrating components of a database system configured to estimate error propagation in selectivity values, according to one embodiment presented in this disclosure.

FIG. 1 is a block diagram 100 illustrating components of a database system configured to estimate error propagation in selectivity values, according to one embodiment presented in this disclosure. The database system includes a DBMS 150 configured to manage a database 154. One or more client applications, such as the application 152, may issue a database query 156 to the DBMS 150 and receive query results 158 responsive to the database query 156. To generate the query results 158, the DBMS 150 may generate measures 174 and query execution plans 176.

In one embodiment, the database 154 is representative of any collection of data, regardless of the particular physical representation of the data. A physical representation of data defines an organizational schema of the data. By way of illustration, the database 154 may be organized according to a relational schema, accessible by Structured Query Language (SQL) queries, or according to an Extensible Markup Language (XML) schema, accessible by XML queries. However, embodiments of the invention are not limited to a particular schema and contemplates extension to schemas presently unknown. As used herein, the term "schema" generically refers to a particular arrangement of data.

In one embodiment, the database 154 stores database tables that include data pages. Each data page is configured to store data rows that, in turn, store information. The database table may also include a database index for logically ordering the data rows. The database index includes index pages. Each index page is configured to store index entries, where each data row is referenced by a corresponding index entry. The data pages and the index pages are arranged to be stored on and retrieved from storage.

In one embodiment, the application 152 issues a request to the DBMS 150, where the request includes a query statement, e.g., a select, insert, or update. Depending on the embodiment, the request issued by the application 152 may be predefined e.g., hard coded as part of the application 152, or may be generated in response to input such as user input.

In one embodiment, to service the request from the application 152, the DBMS 150 performs a number of database operations. For example, the DBMS 150 retrieves index entries and data rows from storage into a database cache, which may reside in main memory. The speed of accessing the storage may be much slower than other operations involved in servicing a request, such as operations involving the database cache. Consequently, performance of the DBMS 150 in servicing the request may be, to a large extent, determined by a frequency with which the DBMS 150 accesses the storage. Accordingly, in one embodiment, the DBMS 150 may manage which data objects reside in the database cache to improve performance of the DBMS and requesting applications.

As shown, components of the DBMS 150 include a query parser 162, a query optimizer 164, a database engine 166, a cache manager 168, and a statistics manager 172. The cache manager 168 includes a database cache 170. The DBMS 150 may interact with the application 152 or a user by receiving query statements from the application 152 or the user. The query statements may result in retrieval of data stored in the database 154.

In one embodiment, upon receiving a query statement, the query parser 162 parses the received query statement. Parsing the query statement may involve checking for correct syntax according to a query language specification associated with the DBMS 150. For example, the query parser 162 may create input tokens from a sequence of characters in the received query statement and generate data structure based on the input tokens. Examples of the data structure include as a parse tree, an abstract syntax tree, etc. Depending on the embodiment, a separate lexical analyzer may be used to create the input tokens from a sequence of characters in the received query statement.

In one embodiment, prior to the query statement being executed, the query optimizer 164 optimizes the query statement. Optimizing the query statement may involve determining how tables addressed by the query statement are accessed. As a result of optimizing the query statement, the query optimizer 164 may determine an access plan from the data structure created by the query parser 162, where the access plan specifies how tables addressed by the query statement are accessed. In other words, the output of the query optimization process is an access plan. The access plan may include, in a proprietary form specific to the query optimizer/DBMS, low-level information specifying precisely what steps the database engine 166 should take and in what order, to execute the query statement. The access plan may also include an estimate by the query optimizer 164 of how long it may take for the database engine 166 to execute the query statement in accordance with the access plan.

In one embodiment, the query optimizer 164 may determine the access plan in the following manner. Depending on the embodiment, the query optimizer 164 may be a rule-based query optimizer or a cost-based query optimizer. A rule-based query optimizer generates an access plan based on predefined rules. The rules may be defined by a database administrator to specify how an access plan is generated from a query statement. These rules, for example, may relate to creating or using indices or may relate to how join statements are performed, e.g., join orders, join algorithms, etc. At least in some cases, the more skillful the user is in specifying the rules, the better the resulting access plan may perform. A cost-based query optimizer includes information on multiple alternative ways that a query statement may be converted into an access plan. The cost-based query optimizer determines an estimated cost for executing each alternative access plan. The cost-based query optimizer then determines the access plan having the lowest estimated cost.

In one embodiment, the database engine 166 executes the query statement using the access plan generated by the query optimizer 164. The database engine 166 retrieves and processes the data for the query statement. The access plan includes a list of instructions to be executed by the database engine 166. The list of instructions specify access methods to be used, data objects to be created, and system resources to be acquired. The database engine 166 may also communicate with the cache manager 168 to specify which data objects from the database 152 are to remain in the database cache 160.

In one embodiment, the cache manager 168 manages the database cache 170, which may be arranged as a buffer pool, and stores/retrieves data and index pages from the database 154. Data pages may correspond to physical blocks of storage that contains the database 154. Depending on the embodiment, the DBMS 150 may also include a media manager (not shown) that communicates with the storage via I/O operations addressing the physical blocks, and the cache manager 168 may interface with the media manager to store and retrieve data. In some embodiments, the cache manager and/or media manager may use operating system functions to store and retrieve data and to thereby manage the database cache 170. These operating system functions may be part of an application programming interface (API) provided by the operating system.

In one embodiment, the database cache 170 includes a collection of frames. Each frame may store a data page from the database 154, as the data page is brought in from storage to memory. Each data page stored in the database cache 170 may include a property indicating whether the respective data page is pinned. Depending on the embodiment, the property may be a boolean or an integer value. A pinned data page indicates to the cache manager 168 that the pinned data page in the frame of the database cache 170 should not be replaced with another data page. An unpinned data page indicates to the cache manager 168 that the unpinned data page in the frame of the database cache 170 may be replaced with another data page. The cache manager 168 may also apply an algorithm—such as the least recently used (LRU) algorithm—to determine which data pages in the database cache 170 should be replaced with data pages subsequently retrieved from disk.

In one embodiment, each data page stored in the database cache 170 may also include a property indicating whether the respective data page is dirty—i.e., whether the data page includes changes that should be persisted to storage. A dirty data page indicates to the cache manager 168 that the dirty data page should be flushed to storage. A clean data page indicates to the cache manager 168 that the clean data page need not be flushed to storage.

In one embodiment, to determine which data pages reside in which frames of the database cache 170, the cache manager 168 may create and/or maintain an index, such as a hash table. The hash table may be implemented as an array referencing lists of tuples. Each tuple includes a data page identifier and a corresponding frame identifier of the frame where the data page identifier is stored in the database cache 170. The statistics manager 172 performs statistical analysis on data objects stored in the database 154, to determine structures of the data objects and distributions of data values in the data objects.

At least in some embodiments, selectivity calculation in a cost-based query optimizer depends on multiple factors. Dispersion, frequent values, histograms, by definition, represent some of the statistical inputs used in selectivity formulation. If formulation of each of these statistical values relies on a sampled subset of the original data—rather than the original data in its entirety—then there is a possibility of a measure of indeterminate error associated with each of the values. These errors affect selectivity calculation for a cost-based query optimizer because the errors result in a deviation between actual and calculated selectivity values. Some approaches, such as summing the individual errors, may often result in an inaccurate estimation of error in the final selectivity outcome. Other approaches, such as defining a constant boundary condition as an error estimate, may result in overestimation or underestimation at least in some cases.

Accordingly, at least some embodiments herein provide techniques for error propagation to more accurately calculate the deviation between actual and estimated selectivity for a cost-based optimizer. Further, the techniques may be extended to calculate a boundary condition for selectivity error, such as by utilizing a maximum error for each individual statistical input.

At least in some embodiments, when two or more variables that have an associated error are added or multiplied, etc., although the associated errors do not necessarily get processed in the same manner, the final result is bound to carry some degree of error that may be accounted for using the techniques disclosed herein. In some embodiments, a predefined set of error propagation rules may be applied to a cost-based optimizer in order to formulate the error propagation in selectivity. Doing so may provide a more accurate estimate of error propagation at least in some cases. Depending on the embodiment, additional adjustments may optionally be made in error propagation in order to properly account for any adjustments made in formulating the estimated selectivity. Table I defines variables to represent measures used in embodiments presented the ensuing discussion.

TABLE I

Variables representing measures involved in estimating error propagation $S_A$ = actual selectivity
$S_E$ = estimated selectivity from the optimizer
$S_D$ = an approximate deviation between the actual and estimated selectivity
$S_{MAX}$ = maximum deviation in selectivity The maximum deviation in selectivity may also be referred to herein as the maximum error in selectivity. At least in some embodiments, the maximum deviation in selectivity pertains to one or more pre-defined ceiling values for statistical input.

In one embodiment, the statistics manager 172 of the DBMS 150 determines and maintains approximate frequencies of a predefined number of distinct column values in a specified table in the database 154 and based on specified criteria. The specified table may also be referred to herein as a frequency table. Depending on the embodiment, the determined frequencies may specific to all rows of given table, a subset rows of a table, or all rows of multiple specified tables.

Further, depending on the embodiment, the determined frequencies may be specific to a single column of a table, multiple columns of a table, or multiple columns of multiple tables. In some embodiments, only the predefined number of distinct column values having the highest frequencies are reflected in the specified table in the database 154. An example of entries in the frequency catalog table, containing the frequencies calculated by sampling the data from a customer table (for a customer_nationkey column) is shown in Table II.

TABLE II

Column frequencies as determined by the statistics manager

| Frequency | Column value |
|---|---|
| 645000 | 5 |
| 1305000 | 6 |
| 1968750 | 7 |
| 2593125 | 14 |
| 3213750 | 15 |
| 3832500 | 16 |
| 4447500 | 18 |
| 5073750 | 21 |
| 5692500 | 23 |
| 6333750 | 24 |

In this particular example, the frequency column represents the respective cumulative frequency associated with each column value. For example, the value of "24" should have 641250 (which is 6333750 minus 5692500) occurrences in the specified column in the database. The value of "23" should have 618750 (which is 5692500 minus 5073750) occurrences in the specified column, and so forth. The value of "5" has over six hundred thousand occurrences in the specified column.

Assume the following database query is submitted to the DBMS 150 in order to query the customer table.

TABLE III

First database query submitted to the DBMS select customer_name from customer where customer_nationkey = 10;

Further, assume a count of the customer_name column is queried as follows:

TABLE IV

Second database query to count rows, and associated result select count(customer_name) from customer where customer_nationkey = 10;
result: 600195

As shown, the query to count the number of rows having a value for the customer_name column, where customer_nationkey=10, produces a count of over six hundred thousand rows.

At least in some embodiments, because a sampling of data only selects a subset of the data, less than all of the data is represented by the sample. For instance, the value of "10" is not included in Table II above, because the column value of "10" may not have met the sampling criteria. The absence of the value "10" from the frequency table may be a source of statistical error insofar as cost-based optimizers rely on the statistical input (in this case, the frequency table) as reflecting an appropriate frequency for the value "10".

Assume that the total number of rows in the customer table is fifteen million rows, also represented herein as 15M rows. In one embodiment, a measure of actual selectivity $S_A$ of the second database query (in Table IV) may be determined as follows:

TABLE V

Determining measure of actual selectivity $$\text{actual selectivity } S_A = \frac{\text{number of returned rows}}{\text{total number of rows in the queried table}}$$
$$= \frac{600195}{15M}$$
$$= 0.0400$$

where the queried table refers to the customer table.

In one embodiment, the estimated selectivity $S_E$ of the second database query may be determined based on a set of predefined rules. To that end, Table VI defines variables to represent additional measures used in embodiments presented the ensuing discussion.

Table VI—Variables Representing Additional Measures in Estimating Error Propagation null_fraction=number of non-null rows/total number of rows in the queried table frequent value fraction=maximum frequency/total number of rows in the queried table num_frequency_table values=number of distinct values represented by the frequency table NDV=number of distinct values in the column of the queried table dispersion=1/NDV The estimated selectivity $S_E$ may then be determined as follows:

TABLE VII

Determining measure of estimated selectivity $$S_E = \frac{1}{\frac{1}{\text{dispersion}} - \text{num\_frequency\_table\_values}} *$$
$$(1 - \text{null\_fraction} - \text{frequent\_value\_fraction})$$
$$= \frac{1 - \text{null\_fraction} - \text{frequent\_value\_fraction}}{\frac{1}{\text{dispersion}} - \text{num\_frequency\_table\_values}}$$

Let $X = 1 - \text{null\_fraction} - \text{frequent\_value\_fraction}$

Let $Y = \frac{1}{\text{dispersion}} - \text{num\_frequency\_table\_values}$
$= \text{NDV} - \text{num\_frequency\_table\_values}$ Assume that the variables have values as shown in Table VIII:

TABLE VIII

Example measure values for estimating error propagation null_fraction = 0 (e.g., supposing that the column contains no null values)
actual number of distinct values in the column = 25
number of distinct values in the column from statistical calculation = 25
num_frequency_table_values = 10

TABLE VIII-continued

Example measure values for estimating error propagation highest cumulative frequency from frequency table = 6333750 (10th entry in this case)
actual cumulative frequency for 10th ordered value from queried table = 6003063

$$\text{frequent\_value\_fraction} = \frac{\text{maximum frequency}}{\text{total number of rows in the queried table}}$$

$$= \frac{6333750}{15M} \sim 0.4222$$

Continuing the example shown in Table VII above, the estimated selectivity $S_E$ may be determined as follows:

TABLE IX

Determining measure of estimated selectivity (continued)

$S_E = X/Y$ $X = 1 - 0 - 0.4222 = 0.5777$ $Y = 25 - 10 = 15$ $S_E = X/Y = 0.5777/15 \approx 0.0385$ In one embodiment, the error associated with the variable X may then be determined as follows:

TABLE X

Determining error associated with the variable X error in null_fraction = 0 (assuming the number of null values is not statistically calculated)

error in X = 1 − error in null_fraction− error in frequent_value_fraction

= 0 − 0 − error in frequent_value_fraction (1 is a constant, so no error)

= −error in frequent_value_fraction $$= -\left(\frac{(6003063 - 6333750)}{15M}\right)$$

$\approx -0.0220$

In one embodiment, because the calculation of the variable Y involves subtraction of two variables, the error associated with the variable Y may then be determined using a predefined addition/subtraction rule of error propagation, as follows:

TABLE XI

Determining error associated with the variable Y error in Y = $\sqrt{(\text{error in NDV})^2 + (\text{error in num\_frequency\_table\_values})^2}$ error in num_frequency_table_values = 0 (because it is a constant number of values gathered)

error in Y = $\sqrt{(25 - 25)^2 + (0)^2} = \sqrt{(0)^2 + (0)^2} = 0$

In one embodiment, because the calculation of the estimated selectivity $S_E$ involves diving X by Y, a measure of absolute error in selectivity $S_D$ may be determined using a predefined quotient rule of error propagation, as follows:

TABLE XII

Determining measure of absolute error in selectivity $$\text{absolute error in selectivity } S_D = S_A * \sqrt{\left(\frac{\text{error in X}}{X}\right)^2 + \left(\frac{\text{error in Y}}{Y}\right)^2}$$

$$= 0.0400 * \sqrt{\left(\frac{-0.0220}{0.5777}\right)^2 + \left(\frac{0}{15}\right)^2}$$

$$\approx 0.0015$$

Consequently, the absolute error in selectivity $S_D$ may provide a more accurate estimate of the deviation between the actual and estimated values of selectivity at least in some cases.

In one embodiment, the techniques discussed above may also be extended to determine a maximum deviation in selectivity values. For instance, suppose a ceiling fraction for errors in underlying individual statistics is defined as being 0.05 (five percent). In one embodiment, a maximum error in X and Y may then be determined for the five percent limit for the input statistics to calculate selectivity, as follows.

TABLE XIII

Determining maximum deviation in selectivity values $X_{MAX} = -5\% * \text{error in frequent\_value\_fraction}$ $$= \frac{-0.05 * 6333750}{15M}$$

$$= -0.0211$$

(similarly, for NDV and num_frequency_table_values, if the values are off by 5%, then)

$$Y_{MAX} = \sqrt{(1.25)^2 + (0.5)^2}$$

$$\approx 1.3463$$

$$S_{MAX} = 0.0400 * \sqrt{\left(\frac{-0.0211}{0.5777}\right)^2 + \left(\frac{1.3463}{15}\right)^2}$$

$$\approx 0.0039$$

As shown from the above calculations of estimated error propagation, if an arbitrary number such as 0.05 (5%) were used as an error tolerance for the estimated selectivity value in this particular example, the arbitrary number might be an inaccurate and overestimated number. The estimated error propagation $S_D$ and the maximum error propagation $S_{MAX}$ in this case are each less than 0.05. Thus, an arbitrarily specified number may often be an inaccurate approach in efforts to determine error propagation. By configuring a database system using the techniques disclosed herein, the database system may more accurately estimate error propagation in selectivity values at least in some cases, at least for cost-based optimizers that use potentially imprecise statistical input data for calculating the selectivity values.

Figure 2:
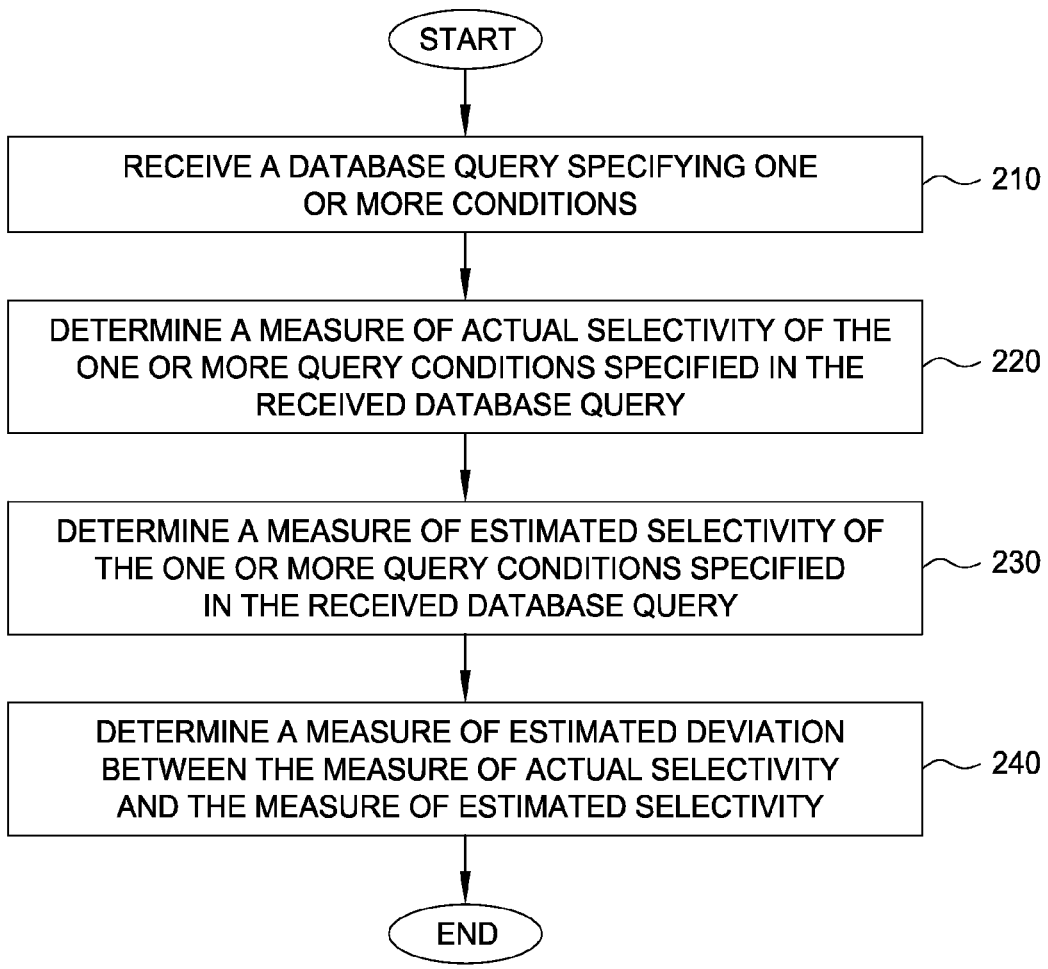
FIG. 2 is a flowchart depicting a method for estimating error propagation for a cost-based optimizer, according to one embodiment presented in this disclosure.

FIG. 2 is a flowchart depicting a method 200 for estimating error propagation for a cost-based optimizer, according to one embodiment presented in this disclosure. As shown, the method 200 begins at step 210, where the DBMS 150, or a predefined component thereof, receives a database query specifying one or more conditions. At step 220, the DBMS 150 determines a measure of actual selectivity of the one or more query conditions specified in the received database query. At step 230, the DBMS 150 determines a measure of estimated selectivity of the one or more query conditions specified in the received database query. At step 240, the DBMS 150 determines a measure of estimated deviation between the measure of actual selectivity and the measure of estimated selectivity. After the step 240, the method 200 terminates.

Figure 3:
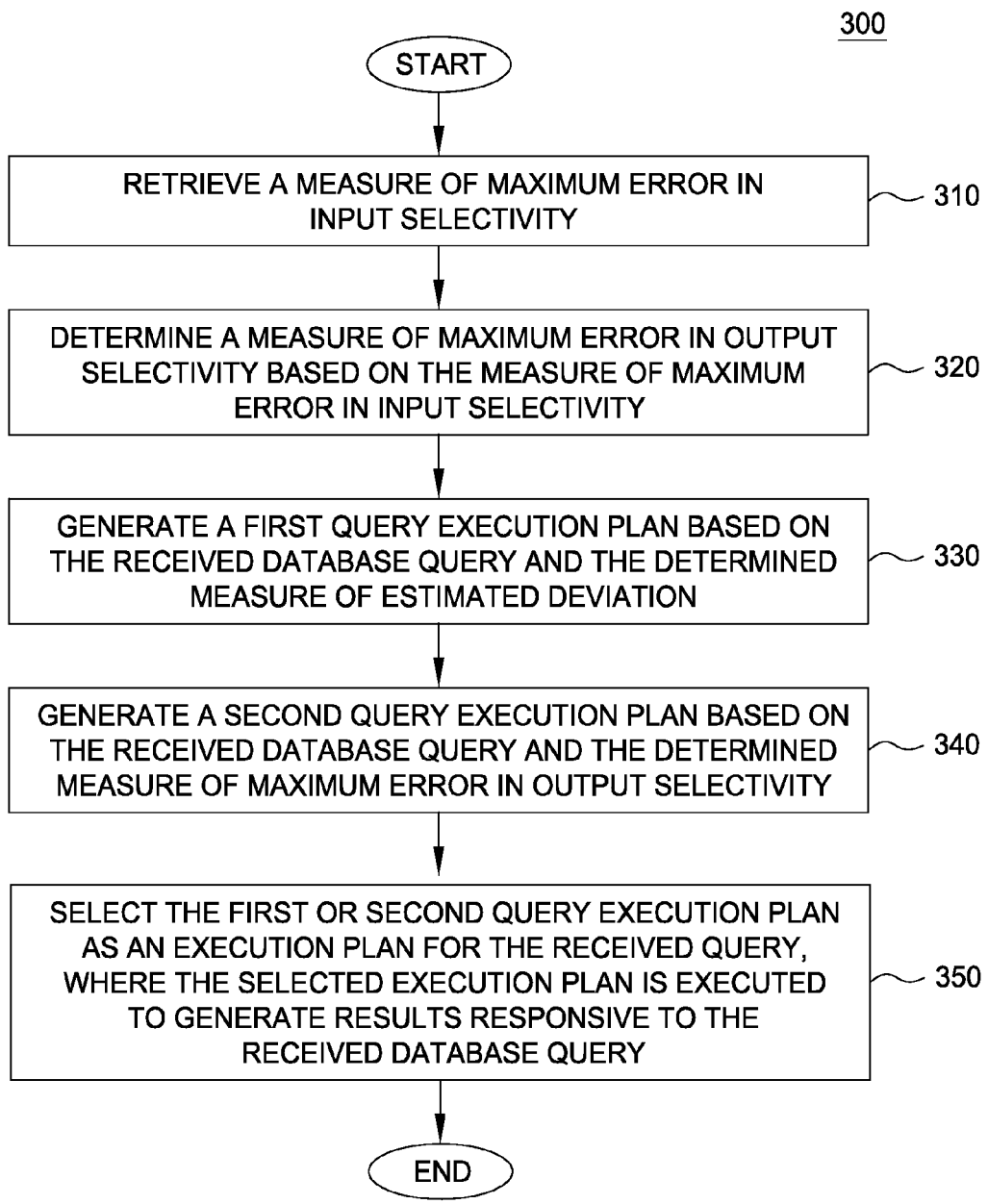
FIG. 3 is a flowchart depicting a method of applying estimated error propagation for a cost-based optimizer, according to one embodiment presented in this disclosure.

FIG. 3 is a flowchart depicting a method 300 of applying estimated error propagation for a cost-based optimizer, according to one embodiment presented in this disclosure. As shown, the method 300 begins at step 310, where the DBMS 150, or a predefined component thereof, receives a measure of maximum error in input selectivity. At step 320, the DBMS 150 determines a measure of maximum error in output selectivity based on the measure of maximum error in input selectivity. At least in some embodiments, usage of these measures of maximum error in selectivity according to the method 300 may be regarded as an optional extension to the method 200 of FIG. 2. Usage of these maximum errors in selectivity as disclosed herein may facilitate generating more desirable query execution plans at least in some cases. For example, as described above, a 0.05 (5%) threshold for error tolerance may be defined, and calculations of estimated error propagation may be performed according to the method 300. The above example indicates that an arbitrary number may result in overestimation, because the estimated error propagation and the maximum error propagation are each less than 0.05.

At step 330, the DBMS 150 generates a first query execution plan based on the received database query and the determined measure of estimated deviation. At step 340, the DBMS 150 generates a second query execution plan based on the received database query and the determined measure of maximum error in output selectivity. The second query execution plan may be different from the first query execution plan. At step 350, the DBMS 150 selects one of the first query execution plan and the second query execution plan, as the execution plan for the received query. The selected execution plan may then be executed to generate results responsive to the received database query. The results may then be returned to the requesting entity. After the step 350, the method 300 terminates.

In one embodiment, the one or more query conditions are applied to at least a first database column in the database. The measure of estimated selectivity may be determined based on a function of one or more numerical components. The one or more numerical components include a first numerical component that is a predefined function of a frequency measure of null values in the first database column and a frequency measure of a non-null value that occurs most frequently in the first database column. Additionally or alternatively, the one or more numerical components further include a second numerical component that is a predefined function of a count of distinct, non-null values in the first database column and a count of distinct values in the first database column, that are represented in a frequency table associated with the first database table in the database. In some embodiments, each predefined function is a distinct function. The measures, numerical components, and predefined functions may be tailored to suit the needs of a particular case.

Embodiments disclosed herein provide techniques for estimating error propagation for cost-based optimizers. In one embodiment, measures of actual and estimated selectivity of one or more query conditions in a received query are determined. A measure of estimated deviation between the measures of actual and estimated selectivity is determined. A query execution plan is generated or selected based on the measure of estimated deviation, and the database system may process queries more efficiently as a result at least in some cases.

FIG. 4 is a block diagram illustrating components of a networked system 400 for estimating error propagation in selectivity values, according to one embodiment presented in this disclosure. The networked system 400 includes a computer 402. The computer 402 may also be connected to other computers via a network 430. In general, the network 430 may be a telecommunications network and/or a wide area network (WAN). In a particular embodiment, the network 430 is the Internet.

The computer 402 generally includes a processor 404 connected via a bus 412 to a memory 406, a network interface device 410, a storage 408, an input device 414, and an output device 416. The computer 402 is generally under the control of an operating system. Examples of operating systems include UNIX, versions of the Microsoft Windows® operating system, and distributions of the Linux® operating system. More generally, any operating system supporting the functions disclosed herein may be used. The processor 404 is included to be representative of a single CPU, multiple CPUs, a single CPU having multiple processing cores, and the like. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 410 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, floppy disc drives, tape drives, removable memory cards or optical storage. The memory 406 and the storage 408 may be part of one virtual address space spanning multiple primary and secondary storage devices.

The input device 414 may be any device for providing input to the computer 402. For example, a keyboard and/or a mouse may be used. The output device 416 may be any device for providing output to a user of the computer 402. For example, the output device 416 may be any conventional display screen or set of speakers. Although shown separately from the input device 414, the output device 416 and input device 414 may be combined. For example, a display screen with an integrated touch-screen may be used.

As shown, the memory 406 of the computer 402 includes the application 152 and the DBMS 150, and the storage 408 of the computer 402 includes the database 154. Although only one database is shown for simplicity, the DBMS 150 may manage multiple databases. Further, the databases may be distributed relative to one another, e.g., over the network 130. And although the application 152 and the DBMS 150 are shown to be executing on the computer 402, the application 152 may also execute on a different computer that communicates with the computer 402 via the network 430. Depending on the embodiment, one or more of the components of the DBMS 150 as depicted in FIG. 1 may execute on the computer 402 or on one or more other computers operatively connected to the computer 402 via the network 430. Further, the application 152 may also execute on one or more other computers operatively connected to the computer 402 via the network 430.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of a client application may submit a database query to be executed by a DBMS available in the cloud and to retrieve results from one or more databases also available in the cloud. Thus, the user may submit database queries and receive query results from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to determine error propagation for a query optimizer component of a database management system (DBMS) for a database, the method comprising:
receiving, from a requesting entity, a database query specifying one or more query conditions to apply to at least a first database column when querying on or more database tables;
determining a measure of actual selectivity of the one or more query conditions specified in the received database query wherein the measure of actual selectivity comprises a predefined function of at least: (i) a total count of rows from the one or more database tables before applying the one or more query conditions; and (ii) a total count of rows returned from the one or more database tables as a result of applying the one or more query conditions;
determining a measure of estimated selectivity of the one or more query conditions specified in the received database query, wherein the measure of estimated selectivity comprises a predefined function of at least two of: (i) the total count of rows from the one or more database tables before applying the one or more query conditions; (ii) a total count of null values in the first database column; (iii) a total count of instances count of distinct values represented in a frequency table associated with the first database table; and (v) a total count of distinct values in the first database column;

determining a measure of estimated deviation between the determined measure of actual selectivity and the determined measure of estimated selectivity; and executing the database query based on the determined measure of eatimated deviation and by operation of one or more computer processors in order to generate a set of results, wherein the set of results is returned to the requesting entity.

2. The computer-implemented method of claim 1, wherein the measure of estimated deviation comprises a predefined function of at least two of a plurality of deviation components including:

(i) a first deviation component comprising the measure of actual selectivity;

(ii) a second deviation component comprising a measure of error in at least one of: (A) the total count of rows from the one or more database tables before applying the one or more query conditions; and (B) the total count of null values in the first database column;

(iii) a third deviation component comprising a measure of error in the total count of distinct values in the first database column; and (iv) a fourth deviation component comprising a measure of error in the total count of distinct values represented in the frequency table;

wherein the computer-implemented method further comprises:

retrieving a measure of maximum error in input selectivity; and determining a measure of maximum error in output selectivity based on the retrieved measure of maximum error in input selectivity;

wherein the query optimizer component is executable to perform each of:

generating a first query execution plan based on the received database query and based further on the determined measure of estimated deviation; and selecting, based on the determined measure of estimated deviation, the first query execution plan from a plurality of distinct query execution plans generated based on the received database query.

3. The computer-implemented method of claim 2, wherein the database query is executable based on the measure of maximum error in output selectivity, wherein the measure of estimated selectivity comprises a predefined function of at least two of a plurality of selectivity components including: (i) a first selectivity component comprising the total count of rows from the one or more database tables before applying the one or more query conditions; (ii) a second selectivity component comprising the total count of null values in the first database column; (iii) a third selectivity component comprising the total count of instances of the non-null value that occurs most frequently in the first database column; (iv) a fourth selectivity component comprising the total count of distinct values represented in the frequency table; and (v) a fifth selectivity component comprising the total count of distinct values in the first database column;

wherein the query optimizer component is further executable to perform each of:

generating a second query execution plan based on the received database query and based further on the determined measure of maximum error in output selectivity; and selecting, based on the determined measure of maximum error in output selectivity, the second query execution plan from the plurality of distinct query execution plans generated based on the received database query.

4. The computer-implemented method of claim 3, wherein the measure of estimated selectivity is not any function of: the total count of rows returned from the one or more database tables as a result of applying the one or more query conditions; wherein the first query execution plan and the second query execution plan are distinct.

5. The computer-implemented method of claim 4, wherein the measure of estimated selectivity comprises a predefined function of at least three of the first, second, third, fourth, and fifth selectivity components.

6. The computer-implemented method of claim 5, wherein the measure of estimated selectivity comprises a predefined function of at least four of the first, second, third, fourth, and fifth selectivity components, wherein the measure of estimated deviation comprises a predefined function of at least three of the first, second, third, and fourth deviation components.

7. The computer-implemented method of claim 6, wherein the measure of estimated selectivity comprises a predefined function of at least the first, second, third, fourth, and fifth selectivity components, wherein the measure of estimated deviation comprises a predefined function of at least the first, second, third, and fourth deviation components, wherein measure of estimated deviation is determined in order to determine error propagation for the query optimizer component, wherein the query optimizer component performs, in respective instances, each of:

generating the first query execution plan based on the received database query and based further on the determined measure of estimated deviation; and selecting, based on the determined measure of estimated deviation, the first query execution plan from the plurality of distinct query execution plans generated based on the received database query.

8. The computer-implemented method of claim 1, wherein the query optimizer component is configured to perform at least one of:

generating the first query execution plan based on the received database query and based further on the determined measure of estimated deviation; and selecting, based on the determined measure of estimated deviation, the first query execution plan from the plurality of distinct query execution plans generated based on the received database query.

9. The computer-implemented method of claim 1, wherein the computer-implemented method further comprises:

retrieving a measure of maximum error in input selectivity; and determining a measure of maximum error in output selectivity based on the retrieved measure of maximum error in input selectivity.

10. The computer-implemented method of claim 9, wherein the database query is executable based on the measure of maximum error in output selectivity.

11. A computer program product to determine error propagation for a query optimizer component of a database management system (DBMS) for a database, the computer program product comprising:

a non-transitory computer-readable medium having program code embodied therewith, the program code executable by one or more computer processors to:

receive, from a requesting entity, a database query specifying one or more query conditions to apply to at least a first database column when querying one or more database tables;

determine a measure of actual selectivity of the one or more query conditions specified in the received database query, wherein the measure of actual selectivity comprises a predefined function of at least: (i) a total count of rows from the one or more database tables before applying the one or more query conditions; and (ii) a total count of rows returned from the one or more database tables as a result of applying the one or more query conditions;

determine a measure of estimated selectivity of the one or more query conditions specified in the received database query, wherein the measure of estimated selectivity comprises a predefined function of at least two of: (i) the total count of rows from the one or more database tables before applying the one or more query conditions; (ii) a total count of null values in the first database column; (iii) a total count of instances of a non-null value that occurs most frequently in the first database column; (iv) a total count of distinct values represented in a frequency table associated with the first database table; and (v) a total count of distinct values in the first database column;

determine a measure of estimated deviation between the determined measure of actual selectivity and the determined measure of estimated selectivity; and executing the database query based on the determined measure of estimated deviation in order to generate a set of results, wherein the set of results is returned to the requesting entity.

12. The computer program product of claim 11, wherein the program code is further executable to:

retrieve a measure of maximum error in input selectivity; and determine a measure of maximum error in output selectivity based on the retrieved measure of maximum error in input selectivity.

13. The computer program product of claim 11, wherein the query optimizer component is configured to perform at least one of:

generating the first query execution plan based on the received database query and based further on the determined measure of estimated deviation; and selecting, based on the determined measure of estimated deviation, the first query execution plan from the plurality of distinct query execution plans generated based on the received database query.

14. The computer program product of claim 11, wherein the program code is further executable to:

retrieve a measure of maximum error in input selectivity; and determine a measure of maximum error in output selectivity based on the retrieved measure of maximum error in input selectivity.

15. The computer program product of claim 14, wherein the database query is executable based on the measure of maximum error in output selectivity.

16. A system to determine error propagation for a query optimizer component of a database management system (DBMS) for a database, the system comprising:

one or more computer processors;

a memory containing a program which, when executed by the one or more computer processors, is configured to perform an operation comprising:

receiving, from a requesting entity, a database query specifying one or more query conditions to apply to at least a first database column when querying one or more database tables;

determining a measure of actual selectivity of the one or more query conditions specified in the received database query, wherein the measure of actual selectivity comprises a predefined function of at least: (i) a total count of rows from the one or more database tables before applying the one or more query conditions; and (ii) a total count of rows returned from the one or more database tables as a result of applying the one or more query conditions;

determining a measure of estimated selectivity of the one or more query conditions specified in the received database query, wherein the measure of estimated selectivity comprises a predefined function of at least two of: (i) the total count of rows from the one or more database tables before applying the one or more query conditions; (ii) a total count of null values in the first database column; (iii) a total count of instances of a non-null value that occurs most frequently in the first database column; (iv) a total count of distinct values represented in a frequency table associated with the first database table; and (v) a total count of distinct values in the first database column;

determining a measure of estimated deviation between the determined measure of actual selectivity and the determined measure of estimated selectivity; and executing the database query based on the determined measure of estimated deviation in order to generate a set of results, wherein the set of results is returned to the requesting entity.

17. The system of claim 16, wherein the operation further comprises:

retrieving a measure of maximum error in input selectivity; and determining a measure of maximum error in output selectivity based on the retrieved measure of maximum error in input selectivity.

18. The system of claim 16, wherein the query optimizer component is configured to perform at least one of:

generating the first query execution plan based on the received database query and based further on the determined measure of estimated deviation; and selecting, based on the determined measure of estimated deviation, the first query execution plan from the plurality of distinct query execution plans generated based on the received database query.

19. The system of claim 16, wherein the operation further comprises:

retrieving a measure of maximum error in input selectivity; and determining a measure of maximum error in output selectivity based on the retrieved measure of maximum error in input selectivity.

20. The system of claim 19, wherein the database query is executable based on the measure of maximum error in output selectivity.

* * * * *